(12) United States Patent
Gomi et al.

(10) Patent No.: US 11,953,325 B2
(45) Date of Patent: Apr. 9, 2024

(54) DIRECTION CALCULATION APPARATUS, DIRECTION CALCULATION METHOD, AND PROGRAM

(71) Applicant: NIPPON TELEGRAPH AND TELEPHONE CORPORATION, Tokyo (JP)

(72) Inventors: Hiroaki Gomi, Tokyo (JP); Ryoma Tanase, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 59 days.

(21) Appl. No.: 17/762,716

(22) PCT Filed: Sep. 27, 2019

(86) PCT No.: PCT/JP2019/038186
§ 371 (c)(1),
(2) Date: Mar. 22, 2022

(87) PCT Pub. No.: WO2021/059495
PCT Pub. Date: Apr. 1, 2021

(65) Prior Publication Data
US 2022/0341736 A1    Oct. 27, 2022

(51) Int. Cl.
*G01C 21/08* (2006.01)
*G01C 21/00* (2006.01)
(Continued)

(52) U.S. Cl.
CPC ........... *G01C 21/08* (2013.01); *G01C 21/005* (2013.01); *G01C 21/20* (2013.01); *G01C 21/3652* (2013.01)

(58) Field of Classification Search
None
See application file for complete search history.

(56) References Cited

U.S. PATENT DOCUMENTS

2013/0218456 A1    8/2013    Zelek et al.
2017/0254662 A1*   9/2017    Takenaka .................. G06F 3/01
(Continued)

FOREIGN PATENT DOCUMENTS

| JP | 2019-148543 A | 9/2019 |
| WO | 2016/031118 A1 | 3/2016 |
| WO | 2019/081747 A1 | 5/2019 |

OTHER PUBLICATIONS

Gomi et al., "Research and Development of Force Sensation Presentation Gadget: 'Buru-Navi3' Pinch-held Mobile Gadget Creating a Sensation of Being Pulled" Image Laboratory 26 (7), pp. 41-44, 2015 with English translation generated by computer.
(Continued)

*Primary Examiner* — Todd Melton (57) ABSTRACT

Provided is a technique for more accurately calculating a direction to be presented to a guided person using a force sensation presentation device held by the guided person. In particular, the device uses geomagnetic distortion. A direction calculation apparatus includes a circuitry configured to calculate a direction to guide the guided person. The calculating uses a geomagnetic map that includes a geomagnetic vector and a gravitational acceleration vector of a reference posture of the device in a reference coordinate system at a position included in a predetermined range. The calculating includes calculating a first matrix and a second matrix to calculate an instructed force sensation vector, which indicates a direction to guide the person. The first matrix includes vectors of the reference posture of the force sensation presentation device. The second vector includes vectors at a current posture of the force sensation presentation device in the reference coordinate system.

8 Claims, 4 Drawing Sheets

(51) Int. Cl.
G01C 21/20 (2006.01)
G01C 21/36 (2006.01)

(56) References Cited

U.S. PATENT DOCUMENTS

2019/0212152 A1 7/2019 Haverinen et al.
2020/0370889 A1 11/2020 Eitel et al.

OTHER PUBLICATIONS

Sun et al. (2006) "A New Solution Algorithm of Magnetic Azimuth" Journal of Physics: Conference Series 48, International Symposium on Instrumentation Science and Technology, pp. 111-116.

* cited by examiner

DIRECTION CALCULATION APPARATUS, DIRECTION CALCULATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/038186, filed on 27 Sep. 2019, the disclosure of which is hereby incorporated herein by reference in its entirety.

TECHNICAL FIELD

The present invention relates to a technique for presenting a direction to a guided person using a force sensation presentation device.

BACKGROUND ART

For example, in walking navigation for a person who speaks a different language or a person who is visually impaired (hereinafter referred to as a guided person), intuitive presentation of a walking direction using a force sensation presentation device is considered effective (refer to NPL 1). Here, a force sensation presentation device is a device that provides a force sensation itself to a person gripping the device or a stimulus (stimulus by a vibration pattern, for example) that causes the person to artificially perceive a force sensation.

In order to be able to present an accurate walking direction to the guided person in this walking navigation, it is necessary to accurately detect an azimuth. As an example of this azimuth detection method, there is a method that uses geomagnetism.

CITATION LIST

Non Patent Literature

NPL 1: Gomi, H., Amemiya, T., Takamuku, S., I to, S., "Research and Development of Force Sensation Presentation Gadget: 'Buru-Navi3' Pinch-held Mobile Gadget Creating a Sensation of Being Pulled" Image Laboratory 26 (7), pp. 41-44, 2015.

SUMMARY OF THE INVENTION

Technical Problem

However, when walking navigation is performed inside a building, for example, the geomagnetism may be significantly distorted due to an influence of a steel frame or the like used in the building and, as a result, the azimuth detected using the geomagnetism changes significantly from the correct azimuth, resulting in the problem that the guided person is navigated in a direction different from the desired direction.

Therefore, an object of the present invention is to provide a technique for more accurately calculating a direction to be presented to a guided person using a force sensation presentation device gripped by the guided person, taking into account geomagnetic distortion.

Means for Solving the Problem

According to an aspect of the present invention, a direction calculation apparatus configured to calculate a direction to be presented to a guided person (hereinafter referred to as a presented direction) using a force sensation presentation device gripped by the guided person includes a first matrix acquisition unit configured to use a geomagnetic map including a geomagnetic vector and a gravitational acceleration vector of a reference posture of the force sensation presentation device in a reference coordinate system at a position included in a predetermined range to acquire, from a current position of the force sensation presentation device, a matrix (hereinafter referred to as a first matrix) composed of a geomagnetic vector, a gravitational acceleration vector, and an outer product vector of these vectors of the reference posture of the force sensation presentation device in the reference coordinate system at the current position, a second matrix acquisition unit configured to acquire a matrix (hereinafter referred to as a second matrix) composed of a geomagnetic vector, a gravitational acceleration vector, and an outer product vector of these vectors of a current posture of the force sensation presentation device in the reference coordinate system at the current position, and a presented direction calculation unit configured to use the first matrix and the second matrix to calculate, from an instructed force sensation vector (hereinafter referred to as a first instructed force sensation vector) in a reference coordinate system indicating a direction to be instructed to the force sensation presentation device, an instructed force sensation vector (hereinafter referred to as a second instructed force sensation vector) in a force sensation presentation device coordinate system indicating a direction to be instructed to the force sensation presentation device, as the presented direction.

According to an aspect of the present invention, a direction calculation apparatus configured to calculate a direction to be presented to a guided person (hereinafter referred to as a presented direction) using a force sensation presentation device gripped by the guided person includes a bias acquisition unit configured to use a geomagnetic map including a bias of an azimuth angle caused by geomagnetic distortion at a position included in a predetermined range to acquire, from a current position of the force sensation presentation device, a bias of an azimuth angle caused by geomagnetic distortion at the current position, a first azimuth angle acquisition unit configured to acquire an azimuth angle (hereinafter referred to as a first azimuth angle) indicating an azimuth of the force sensation presentation device that does not take into account an influence of geomagnetic distortion in a reference coordinate system at the current position, and a presented direction calculation unit configured to use the bias and the first azimuth angle to calculate, from an instructed force sensation vector (hereinafter referred to as a first instructed force sensation vector) in a reference coordinate system indicating a direction to be instructed to the force sensation presentation device, an instructed force sensation vector (hereinafter referred to as a second instructed force sensation vector) in a force sensation presentation device coordinate system indicating a direction to be instructed to the force sensation presentation device, as the presented direction.

Effects of the Invention

According to the present invention, it is possible to more accurately calculate a direction to be presented to a guided person using a force sensation presentation device gripped by the guided person, taking into account geomagnetic distortion.

DESCRIPTION OF EMBODIMENTS

Hereinafter, embodiments of the present invention will be described in detail. Note that components having the same function are denoted by the same reference signs, and redundant description thereof will be omitted.

An example of a walking navigation system will now be described. A guided person grips a force sensation presentation device and walks in a predetermined range such as in a designated building. The force sensation presentation device guides the guided person in a predetermined walking direction by a force sensation provided to the guided person or a stimulus that causes the guided person to artificially perceive a force sensation. In order for a walking navigation system that uses the force sensation presentation device to accurately present instructions related to the walking direction to the guided person, a predetermined walking direction needs to be determined, taking into account an influence of geomagnetic distortion. Thus, in embodiments of the present invention, a geomagnetic map is used that indicates a state of influence of geomagnetic distortion at a position included in a range in which a direction is to be presented to the guided person and navigation is to be performed, that is, a position in a designated building, or the like.

First Embodiment

A direction calculation apparatus 100 is a device that calculates, in real time, a direction to be presented (hereinafter referred to as a presented direction) to the guided person using the force sensation presentation device, and is a device constituting a walking navigation system. That is, a walking navigation system is realized using the direction calculation apparatus 100 and a force sensation presentation device. Here, the force sensation presentation device is a device gripped by the guided person, and the guided person need only grip the device, for example. Further, the direction to be presented to the guided person is typically a direction in which the walking of the guided person is to be guided, but may be a direction in which the attention of the guided person is to be directed.

Note that the direction calculation apparatus 100 is used not only in the configuration of the walking navigation system, but can also be used in a case in which the guided person grips the force sensation presentation device and moves using a method other than walking. For example, the direction calculation apparatus 100 can also be used in a case in which the guided person moves on a bicycle.

Further, because the force sensation presentation device is gripped by the guided person, a posture of the force sensation presentation device is not limited to being kept constant. That is, the force sensation presentation device is not limited to being gripped while being kept in a horizontal direction, and the force sensation presentation device may be gripped upside-down or at an angle. Further, during movement, a height of an arm gripping the force sensation presentation device and a posture of the body may vary.

A position of the force sensation presentation device in a range (predetermined range) in which the guided person is to be guided, and a geomagnetic vector and a gravitational acceleration vector at that position can be measured. For example, a positioning device that uses an ultra-wideband (UWB) can be used as a module that measures the position of the force sensation presentation device, a three-axis geomagnetic sensor can be used as a module that measures the geomagnetic vector, and a three-axis acceleration sensor can be used as a module that measures the gravitational acceleration vector. Further, the force sensation presentation device incorporates the modules described above in an interior thereof, for example, and is thus configured to be capable of measuring the position of the force sensation presentation device, and the geomagnetic vector and the gravitational acceleration vector at that position.

Figure 1:
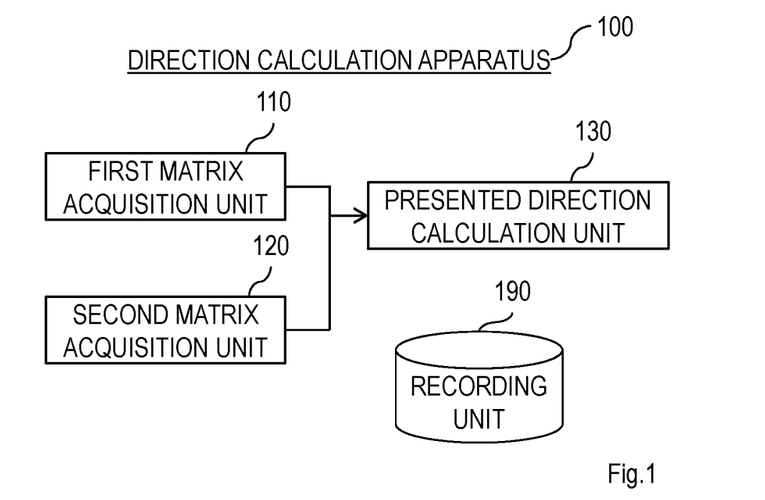
FIG. 1 is a block diagram illustrating an example of a configuration of a direction calculation apparatus 100.
Figure 2:
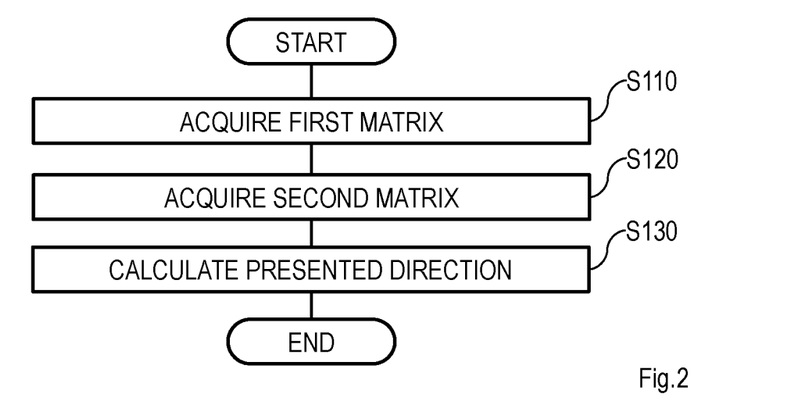
FIG. 2 is a flowchart illustrating an example of an operation of the direction calculation apparatus 100.

Hereinafter, the direction calculation apparatus 100 will be described with reference to FIGS. 1 and 2. FIG. 1 is a block diagram illustrating a configuration of the direction calculation apparatus 100. FIG. 2 is a flowchart illustrating an operation of the direction calculation apparatus 100. As illustrated in FIG. 1, the direction calculation apparatus 100 includes a first matrix acquisition unit 110, a second matrix acquisition unit 120, a presented direction calculation unit 130, and a recording unit 190. The recording unit 190 is a component configured to appropriately record information required for the processing of the direction calculation apparatus 100. The recording unit 190 records in advance, for example, a geomagnetic map including a geomagnetic vector and a gravitational acceleration vector of a reference posture of the force sensation presentation device in a reference coordinate system at a position included in a predetermined range. Here, the reference coordinate system is a coordinate system for expressing a position in a predetermined range, and may be, for example, any three-dimensional coordinate system with a gravitational direction set as a z-axis. Further, the reference posture of the force sensation presentation device is a posture of the force sensation presentation device referenced during measurement of the geomagnetic vector and the gravitational acceleration vector and is, for example, a posture of the force sensation presentation device being gripped by the guided person so as to be in the horizontal direction (so as to be parallel to an xy plane).

Hereinafter, an operation of the direction calculation apparatus 100 will be described with reference to FIG. 2. The first matrix acquisition unit 110, in S110, uses the geomagnetic map recorded in the recording unit 190 to acquire and output, from a current position of the force sensation presentation device, a matrix (hereinafter referred to as a first matrix) composed of a geomagnetic vector, a gravitational acceleration vector, and an outer product vector of these vectors of the reference posture of the force sensation presentation device in the reference coordinate system at the current position. Here, the current position of the force sensation presentation device is, for example, data measured by a module (not illustrated) that measures the position of the device, and the direction calculation apparatus 100 in a location away from the force sensation presentation device receives the measured data from the module via a communication unit (not illustrated) and inputs the data to the first matrix acquisition unit 110.

In S120, the second matrix acquisition unit 120 acquires and outputs a matrix (hereinafter referred to as a second matrix) composed of a geomagnetic vector, a gravitational acceleration vector, and an outer product vector of these of a current posture of the force sensation presentation device in the reference coordinate system at the current position. Here, the geomagnetic vector of the current posture of the force sensation presentation device is, for example, data measured by a module (not illustrated) that measures the geomagnetic vector, and the direction calculation apparatus 100 receives the measured data from the module via a communication unit (not illustrated) and inputs the data to the second matrix acquisition unit 120. Further, the gravitational acceleration vector of the current posture of the force sensation presentation device is, for example, data measured by a module (not illustrated) that measures the gravitational acceleration vector, and the direction calculation apparatus 100 receives the measured data from the module via a communication unit (not illustrated) and inputs the data to the second matrix acquisition unit 120.

In S130, the presented direction calculation unit 130 uses the first matrix acquired in S110 and the second matrix acquired in S120 to calculate, from an instructed force sensation vector (hereinafter referred to as a first instructed force sensation vector) in a reference coordinate system indicating a direction to be instructed to the force sensation presentation device, an instructed force sensation vector (hereinafter referred to as a second instructed force sensation vector) in a force sensation presentation device coordinate system indicating a direction to be instructed to the force sensation presentation device as the presented direction, and outputs the second instructed force sensation vector. Here, the first instructed force sensation vector is input to the direction calculation apparatus 100 by, for example, the guide or a program, and corresponds to a direction in which the walking of the guided person is to be guided or a direction in which the attention of the guided person is to be called. Further, the force sensation presentation device coordinate system is a coordinate system fixed to the force sensation presentation device.

Prior to an explanation of a calculation procedure of the second instructed force sensation vector of the presented direction calculation unit 130, a method for finding an azimuth angle $\theta_b$ indicating an azimuth of the force sensation presentation device taking into account the influence of geomagnetic distortion in the reference coordinate system at the current position of the force sensation presentation device will be described. Given $(x_p, y_p, z_p)$ as position coordinates in the reference coordinate system indicating the current position of the force sensation presentation device, the first matrix $r^c$ $(x_p, y_p, z_p)$ at position $(x_p, y_p, z_p)$ is represented by the following Math. 1:

$$r^c(x_p, y_p, z_p) = [m_p{}^\# g_p{}^\# m_p{}^\# \times g_p{}^\#] \quad \text{[Math. 1]}$$

Here, $m_p{}^\#$ represents the geomagnetic vector of the reference posture of the force sensation presentation device in the reference coordinate system, $g_p{}^\#$ represents the gravitational acceleration vector of the reference posture of the force sensation presentation device in the reference coordinate system, and × represents the outer product of the two vectors.

Further, the second matrix $r^s$ $(x_p, y_p, z_p)$ at position $(x_p, y_p, z_p)$ is represented by the following Math. 2:

$$r^s(x_p, y_p, z_p) = [m_p g_p m_p \times g_p] \quad \text{[Math. 2]}$$

Here, $m_p$ represents the geomagnetic vector of the current posture of the force sensation presentation device in the reference coordinate system, and $g_p$ represents the gravitational acceleration vector of the current posture of the force sensation presentation device in the reference coordinate system.

Hereinafter, the first matrix $r^c$ $(x_p, y_p, z_p)$ and the second matrix $r^s$ $(x_p, y_p, z_p)$ will be denoted as $r^c$, $r^s$, respectively.

Here, given $^cR_s$ as a matrix (rotation conversion matrix) rotated so that the second matrix $r^s$ corresponding to the current posture of the force sensation presentation device matches the first matrix $r^c$ corresponding to the reference posture of the force sensation presentation device, the following Math. 3 holds:

$$r_c = {}^cR_s r^s \quad \text{[Math. 3]}$$

Accordingly, the following Math. 4 is obtained:

$${}^cR_s = r^c(r^s)^{-1} \quad \text{[Math. 4]}$$

Thus, the azimuth angle $\theta_b$ indicating the azimuth of the force sensation presentation device taking into account the influence of geomagnetic distortion in the reference coordinate system at position $(x_p, y_p, z_p)$ is obtained by:

[Math. 5]

$$\theta_b = \operatorname{atan2}(mc_y, mc_x) \quad (1)$$

$$\begin{bmatrix} mc_x \\ mc_y \\ mc_z \end{bmatrix} = r^c(r^s)^{-1} \begin{bmatrix} 1 \\ 0 \\ 0 \end{bmatrix} \quad (2)$$

Here, a tan 2 (y, x) represents an angle formed by vector (x, y) and vector (1, 0).

Below, the calculation procedure of the second instructed force sensation vector of the presented direction calculation unit 130 will be described. First, the presented direction calculation unit 130 calculates the azimuth angle $\theta_b$ from the first matrix $r^c$ and the second matrix $r^s$. Specifically, the calculation need only be made using Math. 1 and Math. 2. Next, the presented direction calculation unit 130 uses the azimuth angle $\theta_b$ to calculate, from the first instructed force sensation vector $f_d{}^c = |f_d{}^c|[\cos\theta_d, \sin\theta_d]^T$ (where $\theta_d$ is the angle formed by the vector $[1, 0]^T$ and the first instructed force sensation vector), the second instructed force sensation vector $f_d{}^b$. Specifically, the calculation is made by the following Math. 6:

$$f_d{}^b = |f_d{}^c|[\cos(\theta_d - \theta_b), \sin(\theta_d - \theta_b)]^T \quad \text{[Math. 6]}$$

Figure 5A:
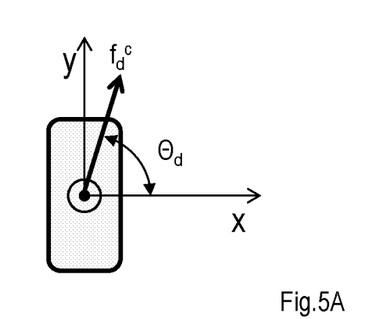
FIG. 5A is a diagram illustrating an example of a first instructed force sensation vector $f_d^c$.
Figure 5B:
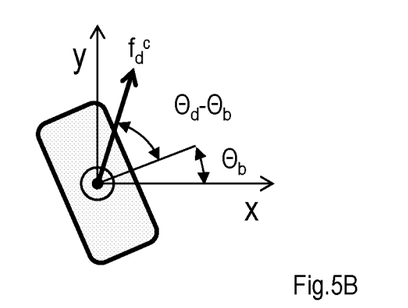
FIG. 5B is a diagram illustrating an example of an actual rotation angle $\theta_d$-$\theta_n$ of the force sensation presentation device.

FIG. 5A is an example of the first instructed force sensation vector $f_d{}^c$. Further, FIG. 5B is an example of an actual rotation angle $\theta_d - \theta_b$ of the force sensation presentation device (that is, the rotation angle of the force sensation presentation device with the influence of the azimuth angle $\theta_b$ removed).

Although not illustrated in FIG. 2, lastly, the direction calculation apparatus 100 transmits the second instructed force sensation vector $f_d{}^b$ to the force sensation presentation device via a communication unit (not illustrated), and the force sensation presentation device presents the direction to the guided person by a force sensation or a stimulus that causes the person to artificially perceive a force sensation in accordance with the received second instructed force sensation vector $f_d{}^b$.

According to the embodiment of the present invention, it is possible to more accurately calculate a direction to be presented to a guided person using a force sensation presentation device gripped by the guided person, taking into account geomagnetic distortion. In the invention of the present embodiment, the azimuth angle $\theta_b$ corresponding to the error caused by the influence of geomagnetic distortion is found using a geomagnetic map, making it possible to provide, as an instruction, a direction obtained by correcting the error to the force sensation presentation device and thus prevent navigation of the guided person in a direction different from the desired direction in the walking navigation system.

Second Embodiment

Similar to the direction calculation apparatus 100, a direction calculation apparatus 200 is a device that calculates, in real time, a direction to be presented (hereinafter referred to as a presented direction) to a guided person using the force sensation presentation device. Note that the position of the force sensation presentation device in a predetermined range, and the geomagnetic vector and the gravitational acceleration vector at that position can be measured in the same manner as that of the direction calculation apparatus 100.

Figure 3:
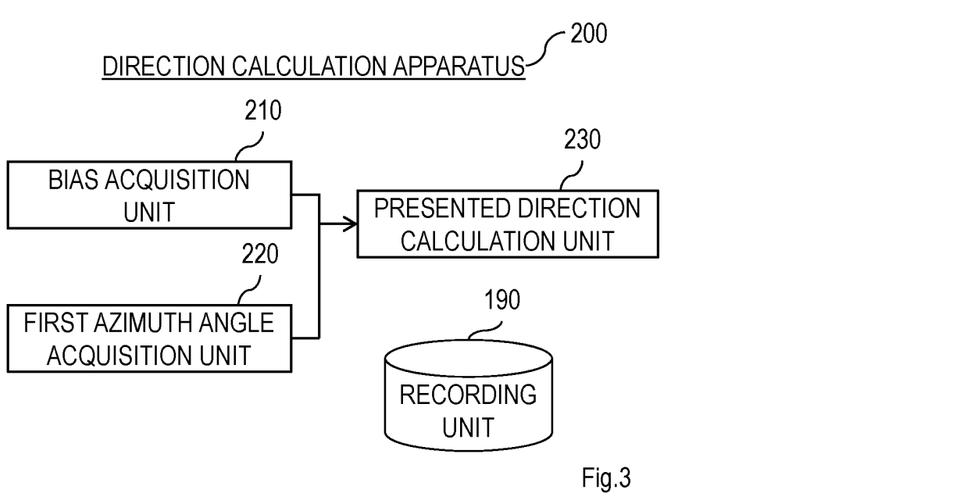
FIG. 3 is a block diagram illustrating an example of a configuration of a direction calculation apparatus 200.
Figure 4:
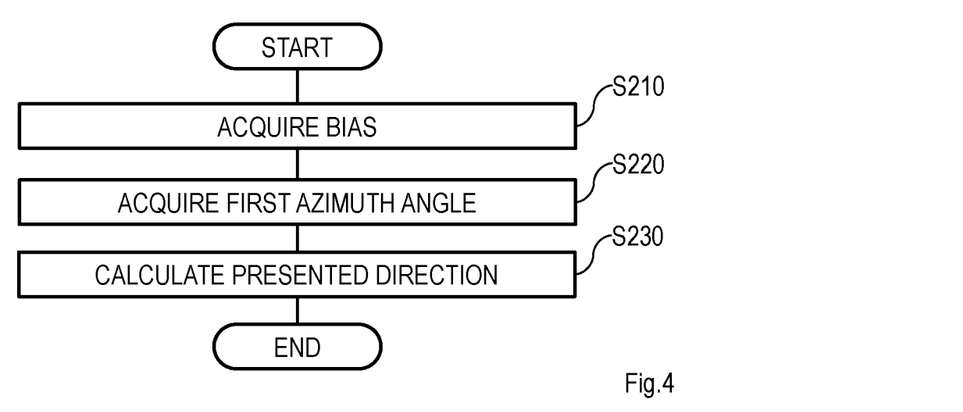
FIG. 4 is a flowchart illustrating an example of an operation of the direction calculation apparatus 200.

Hereinafter, the direction calculation apparatus 200 will be described with reference to FIGS. 3 and 4. FIG. 3 is a block diagram illustrating a configuration of the direction calculation apparatus 200. FIG. 4 is a flowchart illustrating an operation of the direction calculation apparatus 200. As illustrated in FIG. 3, the direction calculation apparatus 200 includes a bias acquisition unit 210, a first azimuth angle acquisition unit 220, a presented direction calculation unit 230, and the recording unit 190. The recording unit 190 is a component configured to appropriately record information required for the processing of the direction calculation apparatus 200. The recording unit 190 records in advance, for example, a geomagnetic map including a bias of the azimuth angle caused by geomagnetic distortion at a position included in a predetermined range.

Hereinafter, an operation of the direction calculation apparatus 200 will be described with reference to FIG. 4. In S210, the bias acquisition unit 210 uses the geomagnetic map recorded in the recording unit 190 to acquire and output, from the current position of the force sensation presentation device, a bias of the azimuth angle caused by geomagnetic distortion at the current position. Here, the current position of the force sensation presentation device is, for example, data measured by a module (not illustrated) that measures the position of the force sensation presentation device, and the direction calculation apparatus 200 in a location away from the force sensation presentation device receives the measured data from the module via a communication unit (not illustrated) and inputs the data to the bias acquisition unit 210.

In S220, the first azimuth angle acquisition unit 220 uses the geomagnetic vector of the current posture of the force sensation presentation device in the reference coordinate system at the current position of the force sensation presentation device to acquire and output an azimuth angle (hereinafter referred to as a first azimuth angle) indicating an azimuth of the force sensation presentation device that does not take into account an influence of geomagnetic distortion in the reference coordinate system at the current position. Here, the geomagnetic vector of the current posture of the force sensation presentation device is, for example, data measured by a module (not illustrated) that measures the geomagnetic vector, and the direction calculation apparatus 200 receives the measured data from the module via a communication unit (not illustrated) and inputs the data to the first azimuth angle acquisition unit 220.

In S230, the presented direction calculation unit 230 uses the bias acquired in S210 and the first azimuth angle acquired in S220 to calculate, from an instructed force sensation vector (hereinafter referred to as a first instructed force sensation vector) in a reference coordinate system indicating a direction to be instructed to the force sensation presentation device, an instructed force sensation vector (hereinafter referred to as a second instructed force sensation vector) in a force sensation presentation device coordinate system indicating a direction to be instructed to the force sensation presentation device as the presented direction, and outputs the second instructed force sensation vector. Here, the first instructed force sensation vector is input to the direction calculation apparatus 200 by, for example, the guide or a program, and corresponds to a direction in which the walking of the guided person is to be guided or a direction in which the attention of the guided person is to be called.

Hereinafter, a calculation procedure of the second instructed force sensation vector of the presented direction calculation unit 230 will be described. Position coordinates in the reference coordinate system indicating the current position of the force sensation presentation device are denoted by $(x_p, y_p, z_p)$. First, the presented direction calculation unit 230 calculates, from the bias and the first azimuth angle $\theta_{b'}$, an azimuth angle $\theta_b$ (hereinafter referred to as a second azimuth angle) indicating an azimuth of the force sensation presentation device that takes into account the influence of geomagnetic distortion in the reference coordinate system at the position $(x_p, y_p, z_p)$. Specifically, the second azimuth angle $\theta_b$ is calculated such that a difference between the first azimuth angle $\theta_{b'}$ and the second azimuth angle $\theta_b$ is equal to the bias. Next, the presented direction calculation unit 230 uses the second azimuth angle $\theta_b$ to calculate, from the first instructed force sensation vector $f_d^c = |f_d^c|[\cos \theta_d, \sin \theta_d]^T$ (where $\theta_d$ is the angle formed by the vector $[1, 0]^T$ and the first instructed force sensation vector), the second instructed force sensation vector $f_{d'}^{b'}$. Specifically, the calculation is made by the following Math. 7:

$$f_{d'}^{b'} = |f_d^c|[\cos(\theta_{d'} - \theta_{b'}), \sin(\theta_{d'} - \theta_{b'})]^T$$

$$\theta_{d'} = \theta_d + (\theta_b - \theta_{b'}) \qquad \text{[Math. 7]}$$

Figure 5C:
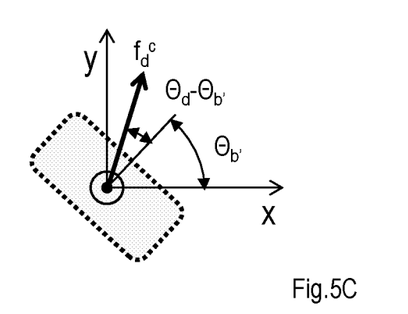
FIG. 5C is a diagram illustrating an example of an erroneous rotation angle $\theta_d$-$\theta_b'$ of the force sensation presentation device.

FIG. 5C indicates an example of an erroneous rotation angle $\theta_d - \theta_{b'}$ of the force sensation presentation device. When the azimuth angle $\theta_{b'}$ that does not take into account the influence of geomagnetic distortion is used as is and the direction is instructed to the force sensation presentation device with $\theta_d - \theta_{b'}$ as the rotation angle, the guided person is guided in the wrong direction. Here, when the azimuth angle $\theta_b$ that takes into account the influence of geomagnetic distortion is used and the direction is instructed to the force sensation presentation device with $\theta_d - \theta_b$ (or $\theta_{d'} - \theta_{b'}$) as the rotation angle, the guided person is guided in the correct direction.

Although not illustrated in FIG. 4, lastly, the direction calculation apparatus 200 transmits the second instructed force sensation vector $f_{d'}^{b'}$ to the force sensation presentation device via a communication unit (not illustrated), and the force sensation presentation device presents the direction to the guided person by a force sensation or a stimulus that causes the person to artificially perceive a force sensation in accordance with the received second instructed force sensation vector $f_{d'}^{b'}$.

The geomagnetic map used in the calculation of the presented direction differs between the first embodiment and the second embodiment. Due to this difference, the second embodiment has the following advantages and disadvantages in comparison with the first embodiment. (Advantages) In the second embodiment, because a geomagnetic map including the bias of the azimuth angle caused by the influence of geomagnetic distortion is used, the data size is smaller than that of the geomagnetic map used in the first embodiment. As a result, the calculation of the second instructed force sensation vector $f_{d'}^{b'}$ can be executed in less time.

(Disadvantages) On the other hand, because the geomagnetic map of the second embodiment includes only a bias of the azimuth angle, the force sensation presentation device is expected to be kept horizontal by the guided person and the problem arises that, when this posture is not maintained, the accuracy of the calculation of the presented direction decreases. There is also the problem that it is not possible to respond to changes in the posture of the force sensation presentation device other than the azimuth.

According to the embodiment of the present invention, it is possible to more accurately calculate a direction to be presented to a guided person using a force sensation presentation device gripped by the guided person, taking into account geomagnetic distortion.

<Supplements>

Figure 6:
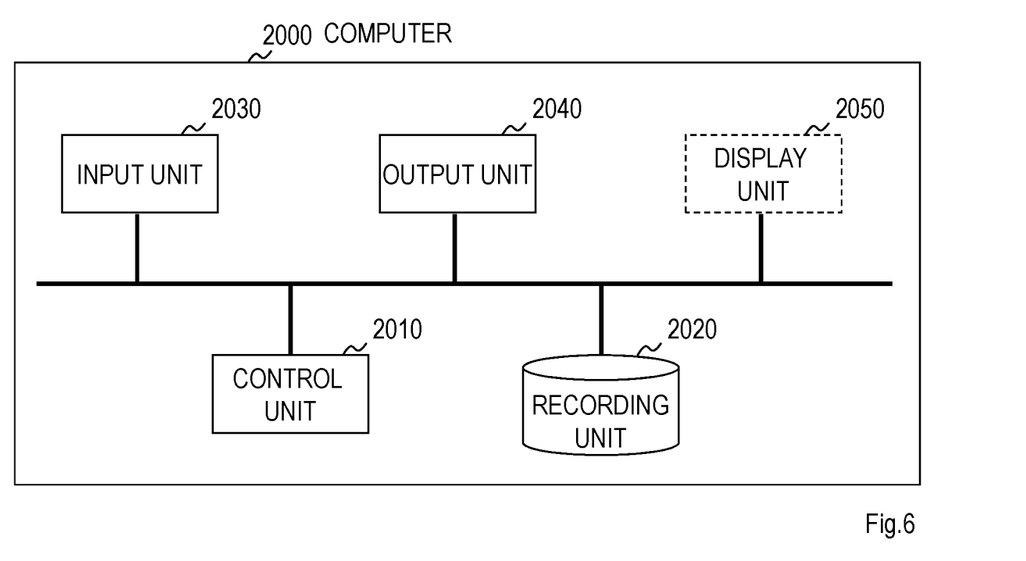
FIG. 6 is a diagram illustrating an example of a functional configuration of a computer realizing each apparatus according to an embodiment of the present invention.

FIG. 6 is a diagram illustrating an example of a functional configuration of a computer realizing each apparatus described above. The processing in each of the above-described apparatuses can be performed by causing a recording unit 2020 to read a program for causing a computer to function as each of the above-described apparatuses, and operating the program in a control unit 2010, an input unit 2030, an output unit 2040, and the like.

The apparatus according to the present invention includes, for example, as a single hardware entity, an input unit to which a keyboard or the like can be connected, an output unit to which a liquid crystal display or the like can be connected, a communication unit to which a communication apparatus (for example, a communication cable) capable of communication with the outside of the hardware entity can be connected, a Central Processing Unit (CPU, which may include a cache memory, a register, and the like), a RAM or a ROM that is a memory, an external storage apparatus that is a hard disk, and a bus connected for data exchange with the input unit, the output unit, the communication unit, the CPU, the RAM, the ROM, and the external storage apparatuses. An apparatus (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage apparatus of the hardware entity (the present invention is not limited to the external storage apparatus; for example, the program may be read out and stored in a ROM that is a dedicated storage apparatus). Further, data obtained by the processing of the program is appropriately stored in a RAM, the external storage apparatus, or the like.

In the hardware entity, each program and data necessary for the processing of each program stored in the external storage apparatus (or a ROM, for example) are read into a memory as necessary and appropriately interpreted, executed, or processed by a CPU. As a result, the CPU realizes predetermined functions (respective components expressed as the above-described, unit, means, or the like).

The present invention is not limited to the above-described embodiment, and appropriate changes can be made without departing from the spirit of the present invention. The processing described in the embodiments are not only executed in time series in the described order, but also may be executed in parallel or individually according to a processing capability of an apparatus that executes the processing or as necessary.

As described above, when a processing function in the hardware entity (the apparatus of the present invention) described in the embodiment is implemented by a computer, processing content of a function that the hardware entity should have is described by a program. By executing this program using the computer, the processing function in the hardware entity is implemented on the computer.

The program in which the processing details are described can be recorded on a computer-readable recording medium. The computer-readable recording medium, for example, may be any type of medium such as a magnetic recording device, an optical disc, a magneto-optical recording medium, or a semiconductor memory. Specifically, for example, a hard disk apparatus, a flexible disk, a magnetic tape, or the like can be used as a magnetic recording apparatus, a DVD (Digital Versatile Disc), a DVD-RAM (Random Access Memory), a CD-ROM (Compact Disc Read Only Memory), CD-R (Recordable)/RW (ReWritable), or the like can be used as an optical disc, an MO (Magneto-Optical disc) or the like can be used as a magneto-optical recording medium, and an EEP-ROM (Electronically Erasable and Programmable-Read Only Memory) or the like can be used as a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network so that the program is distributed.

For example, a computer executing the program first temporarily stores the program recorded on the portable recording medium or the program transmitted from the server computer in its own storage device. When executing the processing, the computer reads the program stored in its own storage device and executes the processing in accordance with the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration to execute the processing through a so-called application service provider (ASP) service in which processing functions are implemented just by issuing an instruction to execute the program and obtaining results without transmitting the program from the server computer to the computer may be employed. Further, the program in this mode is assumed to include information which is provided for processing of a computer and is equivalent to a program (data or the like that has characteristics of regulating processing of the computer rather than being a direct instruction to the computer).

Although the hardware entity is configured by a predetermined program being executed on the computer in the present embodiment, at least a part of the processing content of the hardware entity may be implemented in hardware.

The foregoing description of the embodiments of the present invention has been presented for purposes of illustration and description. The foregoing description does not intend to be exhaustive and does not intend to limit the invention to the precise forms disclosed. Modifications and variations are possible from the teachings above. The embodiments have been chosen and expressed in order to provide the best demonstration of the principles of the present invention, and to enable those skilled in the art to utilize the present invention in numerous embodiments and with addition of various modifications suitable for actual use considered. All such modifications and variations are within the scope of the present invention defined by the appended claims that are interpreted according to the width provided fairly legally and impartially.

The invention claimed is:

1. A direction calculation apparatus for calculating a direction to be presented as a presented direction to a guided person using a force sensation presentation device gripped by the guided person, the direction calculation apparatus comprising circuitry configured to execute operations comprising:

acquiring, using a geomagnetic map including a geomagnetic vector and a gravitational acceleration vector of a reference posture of the force sensation presentation device in a reference coordinate system at a position included in a predetermined range, from a current position of the force sensation presentation device, a first matrix, wherein the first matrix includes a geomagnetic vector, a gravitational acceleration vector, and an outer product vector of the geomagnetic vector and the gravitational acceleration vector of the reference posture of the force sensation presentation device in the reference coordinate system at the current position;

acquiring a second matrix, wherein the second matrix comprises a geomagnetic vector, a gravitational acceleration vector, and an outer product vector of the geomagnetic vector and the gravitational acceleration vector of a current posture of the force sensation presentation device in the reference coordinate system at the current position; and calculating, using the first matrix and the second matrix, from a first instructed force sensation vector, a second instructed force sensation vector, wherein the first instructed force sensation vector is in a reference coordinate system and indicates a direction to be instructed to the force sensation presentation device, and the second instructed force sensation vector is in a force sensation presentation device coordinate system and indicates a direction to be instructed to the force sensation presentation device as the presented direction.

2. The direction calculation apparatus according to claim 1, wherein the first instructed force sensation vector is defined as $f_d^c = |f_d^c|[\cos\theta_d, \sin\theta_d]T$ (where $\theta_d$ represents an angle formed by a vector $[1, 0]^T$ and the first instructed force sensation vector), and the calculating the second instructed force sensation vector further comprises:

calculating, from the first matrix $r^c$ and the second matrix $r^s$, an azimuth angle $\theta_b$ indicating an azimuth of the force sensation presentation device, the azimuth taking into account an influence of geomagnetic distortion in the reference coordinate system at the current position by Math. 8:

[Math. 8]

$$\theta_b = \mathrm{atan2}(mc_y, mc_x)$$

$$\begin{bmatrix} mc_x \\ mc_y \\ mc_z \end{bmatrix} = r^c(r^s)^{-1} \begin{bmatrix} 1 \\ 0 \\ 0 \end{bmatrix};$$

and calculating the second instructed force sensation vector $f_d^b$ by Math. 9:

$$f_d^b = |f_d^c|[\cos(\theta_d - \theta_b), \sin(\theta_d - \theta_b)]^T. \qquad \text{[Math. 9]}$$

3. A computer-readable non-transitory storage medium storing a program for causing a computer to operate as the direction calculation apparatus according to claim 1.

4. A direction calculation apparatus for calculating a direction to be presented as a presented direction to a guided person using a force sensation presentation device gripped by the guided person, the direction calculation apparatus comprising circuitry configured to execute operations comprising:

acquiring, using a geomagnetic map including a bias of an azimuth angle caused by geomagnetic distortion at a position included in a predetermined range, from a current position of the force sensation presentation device, a bias of an azimuth angle caused by geomagnetic distortion at the current position;

acquiring a first azimuth angle, the first azimuth angle indicates an azimuth of the force sensation presentation device, the azimuth without taking into account an influence of geomagnetic distortion in a reference coordinate system at the current position; and calculating, using the bias and the first azimuth angle, from a first instructed force sensation vector in a reference coordinate system indicating a direction to be instructed to the force sensation presentation device, a second instructed force sensation vector in a force sensation presentation device coordinate system, wherein the second instructed force sensation vector indicates a direction to be instructed to the force sensation presentation device as the presented direction.

5. The direction calculation apparatus according to claim 4, wherein the first instructed force sensation vector is defined as $f_d^c = |f_d^c|[\cos\theta_d, \sin\theta_d]^T$, and $\theta_d$ is an angle formed by a vector $[1, 0]^T$ and the first instructed force sensation vector, the calculating the second instructed force sensation vector further comprises calculating, from the bias and the first azimuth angle $\theta_b'$, an azimuth angle $\theta_b$, wherein the azimuth angle $\theta_b$ indicates an azimuth of the force sensation presentation device, and the azimuth takes into account an influence of geomagnetic distortion in the reference coordinate system at the current position, and the calculating the second instructed force sensation vector further comprises calculating the second instructed force sensation vector $f_d^{b'}$ by Math. 10:

$$f_d^{b'} = |f_d^c|[\cos(\theta_d - \theta_{b'}), \sin(\theta_d - \theta_{b'})]^T$$

$$\theta_d = \theta_d + (\theta_b - \theta_b) \qquad \text{[Math. 10]}$$

6. A computer-readable non-transitory storage medium storing a program for causing a computer to operate as the direction calculation apparatus according to claim 4.

7. A direction calculation method in which a direction calculation apparatus calculates a direction to be presented to a guided person as a presented direction using a force sensation presentation device gripped by the guided person, the direction calculation method comprising:
- acquiring, by the direction calculation apparatus, using a geomagnetic map including a geomagnetic vector and a gravitational acceleration vector of a reference posture of a force sensation presentation device in a reference coordinate system at a position included in a predetermined range, from a current position of the force sensation presentation device, a first matrix, wherein the first matrix comprises a geomagnetic vector, a gravitational acceleration vector, and an outer product vector of the geomagnetic vector and the gravitational acceleration vector of the reference posture of the force sensation presentation device in the reference coordinate system at the current position;
- acquiring, by the direction calculation apparatus, a second matrix, wherein the second matrix comprises a geomagnetic vector, a gravitational acceleration vector, and an outer product vector of the geomagnetic vector and the gravitational acceleration vector of a current posture of the force sensation presentation device in the reference coordinate system at the current position; and
- calculating, by the direction calculation apparatus, using the first matrix and the second matrix, from a first instructed force sensation vector in a reference coordinate system indicating a direction to be instructed to the force sensation presentation device, a second instructed force sensation vector in a force sensation presentation device coordinate system as the presented direction, wherein the presented direction indicates a direction to be instructed to the force sensation presentation device.

8. A direction calculation method in which a direction calculation apparatus calculates a direction to be presented to a guided person as a presented direction using a force sensation presentation device gripped by the guided person, the direction calculation method comprising:
- acquiring, by the direction calculation apparatus, using a geomagnetic map including a bias of an azimuth angle caused by geomagnetic distortion at a position included in a predetermined range, from a current position of the force sensation presentation device, a bias of the azimuth angle, wherein the bias of the azimuth angle is caused by geomagnetic distortion at the current position;
- acquiring, by the direction calculation apparatus, a first azimuth angle, wherein the first azimuth angle indicates an azimuth of the force sensation presentation device, and the azimuth is not taking into account an influence of geomagnetic distortion in a reference coordinate system at the current position; and
- calculating, by the direction calculation apparatus, using the bias and the first azimuth angle, from a first instructed force sensation vector in a reference coordinate system indicating a direction to be instructed to the force sensation presentation device, a second instructed force sensation vector in a force sensation presentation device coordinate system as the presented direction, wherein the presented direction indicates a direction to be instructed to the force sensation presentation device.

* * * * *

UNITED STATES PATENT AND TRADEMARK OFFICE
CERTIFICATE OF CORRECTION

| | | |
|---|---|---|
| PATENT NO. | : 11,953,325 B2 | Page 1 of 1 |
| APPLICATION NO. | : 17/762716 | |
| DATED | : April 9, 2024 | |
| INVENTOR(S) | : Gomi et al. | |

It is certified that error appears in the above-identified patent and that said Letters Patent is hereby corrected as shown below:

In the Claims

In Column 11, Line 59 of Claim 2, the text reading:
- $f_d^c = | f_d^c | [\cos\theta_d, \sin\theta_d]T$ -
Should read:
-- $f_d^c = | f_d^c | [\cos\theta_d, \sin\theta_d]^T$ --

Signed and Sealed this
Third Day of December, 2024

Katherine Kelly Vidal
*Director of the United States Patent and Trademark Office*